(12) United States Patent
Maier et al.

(10) Patent No.: US 8,851,756 B2
(45) Date of Patent: Oct. 7, 2014

(54) WHIRL INHIBITING COAST-DOWN BEARING FOR MAGNETIC BEARING SYSTEMS

(75) Inventors: Martin D. Maier, Allegany, NY (US); H. Allan Kidd, Vero Beach, FL (US)

(73) Assignee: Dresser-Rand Company, Olean, NY (US)

( * ) Notice: Subject to any disclaimer, the term of this patent is extended or adjusted under 35 U.S.C. 154(b) by 112 days.

(21) Appl. No.: 13/534,219

(22) Filed: Jun. 27, 2012

(65) Prior Publication Data

US 2013/0004104 A1    Jan. 3, 2013

Related U.S. Application Data

(60) Provisional application No. 61/502,397, filed on Jun. 29, 2011.

(51) Int. Cl.

| F16C 33/02 | (2006.01) |
|---|---|
| F16C 32/06 | (2006.01) |
| F16C 23/04 | (2006.01) |
| F16C 27/00 | (2006.01) |
| F16C 39/02 | (2006.01) |
| F16C 32/04 | (2006.01) |
| F16C 17/02 | (2006.01) |

(52) U.S. Cl.
CPC .............. *F16C 39/02* (2013.01); *F16C 32/0442* (2013.01); *F16C 17/02* (2013.01)
USPC .............. 384/295; 384/99; 384/192; 384/100; 384/120

(58) Field of Classification Search
CPC .......... F16C 17/00; F16C 17/02; F16C 17/12; F16C 17/18; F16C 17/246
USPC ......... 384/106, 202, 276, 295, 192, 100, 120, 384/99
See application file for complete search history.

(56) References Cited

U.S. PATENT DOCUMENTS

| 3,427,083 | A | * | 2/1969 | Linsi ............................ 384/287 |
| 4,222,617 | A | * | 9/1980 | Romberg ........................ 384/99 |
| 4,992,024 | A | * | 2/1991 | Heydrich ...................... 415/229 |

(Continued)

FOREIGN PATENT DOCUMENTS

| CA | 2 647 511 | 10/2007 |
| DE | 44 19 364 A1 | 12/1995 |

(Continued)

OTHER PUBLICATIONS

"Ring." Collins English Dictionary—Complete & Unabridged 10th Edition. HarperCollins Publishers. Feb. 14, 2014. <Dictionary.com http://dictionary.reference.com/browse/ring>.*

(Continued)

*Primary Examiner* — Alan B Waits
(74) *Attorney, Agent, or Firm* — Edmonds & Nolte, PC (57) ABSTRACT

A coast-down bearing and method for a magnetic bearing system is provided. The bearing includes first, second, and third rings disposed around a shaft. The first, second, and third rings each have an inner diameter that is greater than an outer diameter of the shaft and provide a running clearance therebetween. The first, second, and third rings are eccentrically positioned with respect to each other to form a pocket for receiving the shaft during a drop, radial shock, or both.

16 Claims, 3 Drawing Sheets

(56) References Cited

U.S. PATENT DOCUMENTS

| | | | |
|---|---|---|---|
| 5,056,938 A * | 10/1991 | Ahlman et al. | 384/286 |
| 5,191,811 A | 3/1993 | Kogure | |
| 5,201,587 A | 4/1993 | Springer | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,215,384 A | 6/1993 | Maier | |
| 5,215,385 A | 6/1993 | Ide | |
| 5,219,232 A * | 6/1993 | Adams et al. | 384/275 |
| 5,231,323 A | 7/1993 | New | |
| 5,246,346 A | 9/1993 | Schiesser | |
| 5,251,985 A | 10/1993 | Monzel | |
| 5,267,798 A | 12/1993 | Budris | |
| 5,272,403 A | 12/1993 | New | |
| 5,273,249 A | 12/1993 | Peterson et al. | |
| 5,285,123 A | 2/1994 | Kataoka et al. | |
| 5,302,091 A | 4/1994 | Horiuchi | |
| 5,306,051 A | 4/1994 | Loker et al. | |
| 5,310,311 A | 5/1994 | Andres et al. | |
| 5,311,432 A | 5/1994 | Momose | |
| 5,337,779 A | 8/1994 | Fukuhara | |
| 5,340,272 A | 8/1994 | Fehlau | |
| 5,341,527 A | 8/1994 | Schmidt et al. | |
| 5,345,127 A | 9/1994 | New | |
| 5,347,190 A | 9/1994 | Lewis et al. | |
| 5,355,040 A | 10/1994 | New | |
| 5,355,042 A | 10/1994 | Lewis et al. | |
| 5,356,226 A | 10/1994 | Onishi et al. | |
| 5,378,121 A | 1/1995 | Hackett | |
| 5,385,446 A | 1/1995 | Hays | |
| 5,403,019 A | 4/1995 | Marshall | |
| 5,421,655 A | 6/1995 | Ide et al. | |
| 5,421,708 A | 6/1995 | Utter et al. | |
| 5,425,345 A | 6/1995 | Lawrence et al. | |
| 5,425,584 A | 6/1995 | Ide | |
| 5,427,455 A | 6/1995 | Bosley | |
| 5,443,581 A | 8/1995 | Malone | |
| 5,445,013 A | 8/1995 | Clayton, Jr. et al. | |
| 5,484,521 A | 1/1996 | Kramer | |
| 5,494,448 A | 2/1996 | Johnson et al. | |
| 5,495,221 A | 2/1996 | Post | |
| 5,496,394 A | 3/1996 | Nied | |
| 5,500,039 A | 3/1996 | Mori et al. | |
| 5,509,782 A | 4/1996 | Streeter | |
| 5,514,924 A | 5/1996 | McMullen et al. | |
| 5,521,448 A | 5/1996 | Tecza et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,547,287 A | 8/1996 | Zeidan | |
| 5,575,309 A | 11/1996 | Connell | |
| 5,585,000 A | 12/1996 | Sassi | |
| 5,593,232 A | 1/1997 | Maier | |
| 5,601,155 A | 2/1997 | Gardner | |
| 5,605,172 A | 2/1997 | Schubert et al. | |
| 5,616,976 A | 4/1997 | Fremerey et al. | |
| 5,628,623 A | 5/1997 | Skaggs | |
| 5,630,881 A | 5/1997 | Ogure et al. | |
| 5,634,492 A | 6/1997 | Steinruck et al. | |
| 5,640,472 A | 6/1997 | Meinzer et al. | |
| 5,641,280 A | 6/1997 | Timuska | |
| 5,642,944 A | 7/1997 | Dublin, Jr. | |
| 5,645,399 A | 7/1997 | Angus | |
| 5,651,616 A | 7/1997 | Hustak et al. | |
| 5,653,347 A | 8/1997 | Larsson | |
| 5,664,420 A | 9/1997 | Hays | |
| 5,669,717 A | 9/1997 | Kostrzewsky | |
| 5,682,759 A | 11/1997 | Hays | |
| 5,683,185 A | 11/1997 | Buse | |
| 5,683,235 A | 11/1997 | Welch | |
| 5,685,691 A | 11/1997 | Hays | |
| 5,687,249 A | 11/1997 | Kato | |
| 5,693,125 A | 12/1997 | Dean | |
| 5,693,994 A | 12/1997 | New | |
| 5,703,424 A | 12/1997 | Dorman | |
| 5,709,528 A | 1/1998 | Hablanian | |
| 5,713,720 A | 2/1998 | Barhoum | |
| 5,714,818 A | 2/1998 | Eakman et al. | |
| 5,720,799 A | 2/1998 | Hays | |
| 5,738,356 A | 4/1998 | Marshall | |
| 5,738,445 A | 4/1998 | Gardner | |
| 5,743,654 A | 4/1998 | Ide et al. | |
| 5,749,700 A | 5/1998 | Henry et al. | |
| 5,750,040 A | 5/1998 | Hays | |
| 5,752,774 A | 5/1998 | Heshmat et al. | |
| 5,759,011 A | 6/1998 | Moll | |
| 5,775,882 A | 7/1998 | Kiyokawa et al. | |
| 5,779,619 A | 7/1998 | Borgstrom et al. | |
| 5,791,868 A | 8/1998 | Bosley et al. | |
| 5,795,135 A | 8/1998 | Nyilas et al. | |
| 5,797,990 A | 8/1998 | Li | |
| 5,800,092 A | 9/1998 | Nill et al. | |
| 5,803,612 A | 9/1998 | Bättig | |
| 5,810,485 A | 9/1998 | Dublin, Jr. | |
| 5,810,558 A | 9/1998 | Streeter | |
| 5,827,040 A | 10/1998 | Bosley et al. | |
| 5,848,616 A | 12/1998 | Vogel et al. | |
| 5,850,857 A | 12/1998 | Simpson | |
| 5,853,585 A | 12/1998 | Nesseth | |
| 5,863,023 A | 1/1999 | Evans et al. | |
| 5,866,518 A | 2/1999 | Dellacorte et al. | |
| 5,899,435 A | 5/1999 | Mitsch et al. | |
| 5,927,720 A | 7/1999 | Zinsmeyer et al. | |
| 5,935,053 A | 8/1999 | Strid | |
| 5,938,803 A | 8/1999 | Dries | |
| 5,938,819 A | 8/1999 | Seery | |
| 5,946,915 A | 9/1999 | Hays | |
| 5,948,030 A | 9/1999 | Miller et al. | |
| 5,951,066 A | 9/1999 | Lane et al. | |
| 5,957,656 A | 9/1999 | De Long | |
| 5,965,022 A | 10/1999 | Gould | |
| 5,967,746 A | 10/1999 | Hagi et al. | |
| 5,971,702 A | 10/1999 | Afton et al. | |
| 5,971,907 A | 10/1999 | Johannemann et al. | |
| 5,977,677 A | 11/1999 | Henry et al. | |
| 5,980,218 A | 11/1999 | Takahashi et al. | |
| 5,988,524 A | 11/1999 | Odajima et al. | |
| 6,011,829 A | 1/2000 | Panasik | |
| 6,035,934 A | 3/2000 | Stevenson et al. | |
| 6,036,435 A | 3/2000 | Oklejas | |
| 6,059,539 A | 5/2000 | Nyilas et al. | |
| 6,068,447 A | 5/2000 | Foege | |
| 6,078,120 A | 6/2000 | Casaro et al. | |
| 6,090,174 A | 7/2000 | Douma et al. | |
| 6,090,299 A | 7/2000 | Hays et al. | |
| 6,095,690 A | 8/2000 | Nielgel | |
| 6,111,333 A | 8/2000 | Takahashi et al. | |
| 6,113,675 A | 9/2000 | Branstetter | |
| 6,122,915 A | 9/2000 | Hays | |
| 6,123,363 A | 9/2000 | Burgard et al. | |
| 6,135,639 A * | 10/2000 | Dede | 384/99 |
| 6,145,844 A | 11/2000 | Waggott | |
| 6,149,825 A | 11/2000 | Gargas | |
| 6,151,881 A | 11/2000 | Ai et al. | |
| 6,155,720 A | 12/2000 | Bättig | |
| 6,191,513 B1 | 2/2001 | Chen et al. | |
| 6,194,801 B1 | 2/2001 | Göransson | |
| 6,196,809 B1 | 3/2001 | Takahashi et al. | |
| 6,196,962 B1 | 3/2001 | Purvey et al. | |
| 6,206,202 B1 | 3/2001 | Galk et al. | |
| 6,214,075 B1 | 4/2001 | Filges et al. | |
| 6,217,637 B1 | 4/2001 | Toney et al. | |
| 6,227,379 B1 | 5/2001 | Nesseth | |
| 6,232,688 B1 | 5/2001 | Ress, Jr. et al. | |
| 6,244,749 B1 | 6/2001 | Nakagawa et al. | |
| 6,255,752 B1 | 7/2001 | Werner | |
| 6,277,278 B1 | 8/2001 | Conrad et al. | |
| 6,309,174 B1 | 10/2001 | Oklejas, Jr. et al. | |
| 6,310,414 B1 | 10/2001 | Agahi et al. | |
| 6,312,021 B1 | 11/2001 | Thomas | |

(56) References Cited

U.S. PATENT DOCUMENTS

| | | | |
|---|---|---|---|
| 6,314,738 B1 | 11/2001 | Hays |
| 6,353,272 B1 | 3/2002 | van der Hoeven |
| 6,353,273 B1 | 3/2002 | Heshmat et al. |
| 6,367,241 B1 | 4/2002 | Ress, Jr. et al. |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,390,789 B1 | 5/2002 | Grob et al. |
| 6,394,764 B1 | 5/2002 | Samurin |
| 6,398,400 B1 | 6/2002 | Nienhaus |
| 6,398,973 B1 | 6/2002 | Saunders et al. |
| 6,402,385 B1 | 6/2002 | Hayakawa et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,609,882 B2 | 8/2003 | Urlichs |
| 6,616,719 B1 | 9/2003 | Sun et al. |
| 6,617,731 B1 | 9/2003 | Goodnick et al. |
| 6,617,733 B1 | 9/2003 | Yamauchi et al. |
| 6,629,825 B2 | 10/2003 | Stickland et al. |
| 6,631,617 B1 | 10/2003 | Dreiman et al. |
| 6,637,942 B2 | 10/2003 | Dourlens et al. |
| 6,658,986 B2 | 12/2003 | Pitla et al. |
| 6,659,143 B1 | 12/2003 | Taylor et al. |
| 6,666,134 B2 | 12/2003 | Gusching et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,770,993 B1 | 8/2004 | Heshmat et al. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,810,311 B2 | 10/2004 | Winner et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,846,158 B2 | 1/2005 | Hull |
| 6,878,187 B1 | 4/2005 | Hays et al. |
| 6,893,208 B2 | 5/2005 | Frosini et al. |
| 6,907,933 B2 | 6/2005 | Choi et al. |
| 6,957,945 B2 | 10/2005 | Tong et al. |
| 6,966,746 B2 | 11/2005 | Cardenas et al. |
| 6,979,358 B2 | 12/2005 | Ekker et al. |
| 6,987,339 B2 | 1/2006 | Adams et al. |
| 7,001,448 B1 | 2/2006 | West |
| 7,004,719 B2 | 2/2006 | Baldassarre et al. |
| 7,013,978 B2 | 3/2006 | Appleford et al. |
| 7,018,104 B2 | 3/2006 | Dourlens et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,048,495 B2 | 5/2006 | Osgood |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson |
| 7,240,583 B2 | 7/2007 | Wingett et al. |
| 7,241,392 B2 | 7/2007 | Maier |
| 7,244,111 B2 | 7/2007 | Suter et al. |
| 7,258,713 B2 | 8/2007 | Eubank et al. |
| 7,264,430 B2 | 9/2007 | Bischof et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,352,090 B2 | 4/2008 | Gustafson et al. |
| 7,367,713 B2 | 5/2008 | Swann et al. |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,403,392 B2 | 7/2008 | Attlesey et al. |
| 7,429,811 B2 | 9/2008 | Palazzolo et al. |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,517,155 B2* | 4/2009 | Stout et al. ............ 384/535 |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kolle |
| 7,694,540 B2 | 4/2010 | Ishida et al. |
| 7,703,290 B2 | 4/2010 | Bladon et al. |
| 7,703,432 B2* | 4/2010 | Shaffer ............ 123/197.4 |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,836,601 B2 | 11/2010 | El-Shafei |
| 7,846,228 B1 | 12/2010 | Saaski et al. |
| 7,850,427 B2 | 12/2010 | Peer et al. |
| 7,884,521 B2 | 2/2011 | Buhler et al. |
| 7,963,160 B2 | 6/2011 | Bisgaard |
| 8,006,544 B2 | 8/2011 | Holmes et al. |
| 8,061,970 B2 | 11/2011 | Maier et al. |
| 8,109,168 B2 | 2/2012 | Wurm et al. |
| 8,118,570 B2* | 2/2012 | Meacham et al. ............ 417/407 |
| 8,182,153 B2* | 5/2012 | Singh et al. ............ 384/99 |
| 8,191,410 B2 | 6/2012 | Hansen et al. |
| 8,283,825 B2 | 10/2012 | Maier |
| 8,353,633 B2 | 1/2013 | Griffin |
| 8,535,022 B2* | 9/2013 | Takei et al. ............ 417/407 |
| 2002/0009361 A1 | 1/2002 | Reichert et al. |
| 2002/0197150 A1 | 12/2002 | Urlichs |
| 2003/0029318 A1 | 2/2003 | Firey |
| 2003/0035718 A1 | 2/2003 | Langston et al. |
| 2003/0136094 A1 | 7/2003 | Illingworth et al. |
| 2003/0212476 A1 | 11/2003 | Aanen et al. |
| 2004/0007261 A1 | 1/2004 | Cornwell |
| 2004/0024565 A1 | 2/2004 | Yu et al. |

(56) References Cited

U.S. PATENT DOCUMENTS

| | | |
|---|---|---|
| 2004/0047526 A1 | 3/2004 | DeWachter et al. |
| 2004/0061500 A1 | 4/2004 | Lou et al. |
| 2004/0086376 A1 | 5/2004 | Baldassarre et al. |
| 2004/0101395 A1 | 5/2004 | Tong et al. |
| 2004/0117088 A1 | 6/2004 | Dilger |
| 2004/0170505 A1 | 9/2004 | Lenderink et al. |
| 2004/0179961 A1 | 9/2004 | Pugnet et al. |
| 2004/0189124 A1 | 9/2004 | Baudelocque et al. |
| 2005/0008271 A1 | 1/2005 | Lee |
| 2005/0106015 A1 | 5/2005 | Osgood |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0140747 A1 | 6/2006 | Vandervort et al. |
| 2006/0157251 A1 | 7/2006 | Stinessen et al. |
| 2006/0157406 A1 | 7/2006 | Maier |
| 2006/0177166 A1 | 8/2006 | Stadlmayr et al. |
| 2006/0186671 A1 | 8/2006 | Honda et al. |
| 2006/0193728 A1 | 8/2006 | Lindsey et al. |
| 2006/0204153 A1 | 9/2006 | Alam et al. |
| 2006/0222515 A1 | 10/2006 | Delmotte et al. |
| 2006/0230933 A1 | 10/2006 | Harazim |
| 2006/0239831 A1 | 10/2006 | Garris et al. |
| 2006/0254659 A1 | 11/2006 | Bellott et al. |
| 2006/0275160 A1 | 12/2006 | Leu et al. |
| 2007/0029091 A1 | 2/2007 | Stinessen et al. |
| 2007/0036476 A1 | 2/2007 | Lane et al. |
| 2007/0036646 A1 | 2/2007 | Nguyen et al. |
| 2007/0051245 A1 | 3/2007 | Yun |
| 2007/0051576 A1 | 3/2007 | Shimoda et al. |
| 2007/0062374 A1 | 3/2007 | Kolle |
| 2007/0065317 A1 | 3/2007 | Stock |
| 2007/0084340 A1 | 4/2007 | Dou et al. |
| 2007/0122265 A1 | 5/2007 | Ansari et al. |
| 2007/0140870 A1 | 6/2007 | Fukanuma et al. |
| 2007/0151922 A1 | 7/2007 | Mian |
| 2007/0163215 A1 | 7/2007 | Lagerstadt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz et al. |
| 2008/0031732 A1 | 2/2008 | Peer et al. |
| 2008/0039732 A9 | 2/2008 | Bowman |
| 2008/0095609 A1 | 4/2008 | Block et al. |
| 2008/0101918 A1 | 5/2008 | Block et al. |
| 2008/0101929 A1 | 5/2008 | Allen et al. |
| 2008/0115570 A1 | 5/2008 | Ante et al. |
| 2008/0116316 A1 | 5/2008 | Manfredotti et al. |
| 2008/0246281 A1 | 10/2008 | Agrawal et al. |
| 2008/0252162 A1 | 10/2008 | Post |
| 2008/0260539 A1 | 10/2008 | Stinessen et al. |
| 2008/0293503 A1 | 11/2008 | Vignal |
| 2008/0315812 A1 | 12/2008 | Balboul |
| 2008/0317584 A1 | 12/2008 | Murase et al. |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0046963 A1 | 2/2009 | Ozaki et al. |
| 2009/0151928 A1 | 6/2009 | Lawson |
| 2009/0159523 A1 | 6/2009 | McCutchen |
| 2009/0169407 A1 | 7/2009 | Yun |
| 2009/0173095 A1 | 7/2009 | Bhatia et al. |
| 2009/0173148 A1 | 7/2009 | Jensen |
| 2009/0266231 A1 | 10/2009 | Franzen et al. |
| 2009/0295244 A1 | 12/2009 | Ries |
| 2009/0302698 A1 | 12/2009 | Menz et al. |
| 2009/0304496 A1 | 12/2009 | Maier |
| 2009/0309439 A1 | 12/2009 | Yamamoto |
| 2009/0311089 A1 | 12/2009 | Begin et al. |
| 2009/0321343 A1 | 12/2009 | Maier |
| 2009/0324391 A1 | 12/2009 | Maier |
| 2010/0007133 A1 | 1/2010 | Maier |
| 2010/0007283 A1 | 1/2010 | Shimoyoshi et al. |
| 2010/0010701 A1 | 1/2010 | Gärtner |
| 2010/0021095 A1 | 1/2010 | Maier |
| 2010/0021292 A1 | 1/2010 | Maier et al. |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot et al. |
| 2010/0072121 A1 | 3/2010 | Maier |
| 2010/0074768 A1 | 3/2010 | Maier |
| 2010/0080686 A1 | 4/2010 | Teragaki |
| 2010/0083690 A1 | 4/2010 | Sato et al. |
| 2010/0090087 A1 | 4/2010 | Maier |
| 2010/0127589 A1 | 5/2010 | Kummeth |
| 2010/0129212 A1 | 5/2010 | Berger et al. |
| 2010/0139270 A1 | 6/2010 | Koch et al. |
| 2010/0143172 A1 | 6/2010 | Sato et al. |
| 2010/0163232 A1 | 7/2010 | Koll |
| 2010/0180589 A1 | 7/2010 | Berger et al. |
| 2010/0183438 A1 | 7/2010 | Maier et al. |
| 2010/0239419 A1 | 9/2010 | Maier |
| 2010/0239437 A1 | 9/2010 | Maier et al. |
| 2010/0247299 A1 | 9/2010 | Maier |
| 2010/0257827 A1 | 10/2010 | Lane et al. |
| 2010/0310366 A1 | 12/2010 | Eguchi et al. |
| 2011/0017307 A1 | 1/2011 | Kidd et al. |
| 2011/0038716 A1 | 2/2011 | Frankenstein et al. |
| 2011/0044832 A1 | 2/2011 | Nijhuis |
| 2011/0052109 A1 | 3/2011 | Tecza et al. |
| 2011/0052432 A1 | 3/2011 | Cunningham et al. |
| 2011/0061536 A1 | 3/2011 | Maier et al. |
| 2011/0085752 A1 | 4/2011 | Tecza et al. |
| 2012/0106883 A1 | 5/2012 | Griffin |
| 2013/0015731 A1 | 1/2013 | Griffin et al. |

FOREIGN PATENT DOCUMENTS

| | | |
|---|---|---|
| DE | 692 17 540 T2 | 9/1997 |
| DE | 102 05 971 A1 | 11/2002 |
| EP | 1 300 600 A2 | 10/2002 |
| EP | 1 582 703 A2 | 10/2005 |
| EP | 0 875 694 B1 | 1/2006 |
| EP | 2 013 479 | 1/2009 |
| EP | 7838631.5 | 12/2009 |
| GB | 2 323 639 A | 9/1998 |
| GB | 2 337 561 A | 11/1999 |
| JP | 54099206 | 1/1978 |
| JP | H 02-96016 U | 7/1990 |
| JP | H 06-173948 A | 6/1994 |
| JP | 08-068501 A | 3/1996 |
| JP | 08-082397 | 3/1996 |
| JP | 8-284961 A | 11/1996 |
| JP | H 09-74736 A | 3/1997 |
| JP | H 10-502722 A | 3/1998 |
| JP | 2001-124062 A | 5/2001 |
| JP | 2002-106565 A | 4/2002 |
| JP | 2002-218708 A | 8/2002 |
| JP | 2002-242699 A | 8/2002 |
| JP | 2004-034017 A | 2/2004 |
| JP | 2004-340248 A | 12/2004 |
| JP | 2005-291202 A | 10/2005 |
| JP | 3711028 B2 | 10/2005 |
| JP | 2007-162726 A | 6/2007 |
| KR | 94-702296 A | 1/1994 |
| KR | 10-1996-0065432 | 12/1996 |
| KR | 10-0207986 B1 | 7/1999 |
| KR | 10-2007-0106390 | 1/2007 |
| KR | 2009-0085521 A | 8/2009 |
| MX | 2008-012579 A | 12/2008 |
| WO | WO 95/13477 A1 | 5/1995 |
| WO | WO 95/24563 A1 | 9/1995 |
| WO | WO 01/17096 A1 | 3/2001 |
| WO | WO 01/57408 A1 | 8/2001 |
| WO | WO 2006/098806 A1 | 9/2006 |
| WO | WO 2007/043889 A1 | 4/2007 |
| WO | WO 2007/047976 A1 | 4/2007 |
| WO | WO 2007/067169 A1 | 6/2007 |
| WO | WO 2007/103248 A2 | 9/2007 |
| WO | WO 2007/120506 A3 | 10/2007 |
| WO | WO 2008/036221 A3 | 10/2007 |

(56) References Cited

FOREIGN PATENT DOCUMENTS

| | | |
|---|---|---|
| WO | WO 2008/036394 A3 | 3/2008 |
| WO | WO 2008/039446 A3 | 4/2008 |
| WO | WO 2008/039491 A3 | 4/2008 |
| WO | WO 2008/039731 A3 | 4/2008 |
| WO | WO 2008/039732 A3 | 4/2008 |
| WO | WO 2008/039733 A2 | 4/2008 |
| WO | WO 2008/039734 A3 | 4/2008 |
| WO | WO 2009/111616 A3 | 9/2009 |
| WO | WO 2009/158252 A1 | 12/2009 |
| WO | WO 2009/158253 A1 | 12/2009 |
| WO | WO 2010/083416 A1 | 7/2010 |
| WO | WO 2010/083427 A1 | 9/2010 |
| WO | WO 2010/107579 A1 | 9/2010 |
| WO | WO 2010/110992 A1 | 9/2010 |
| WO | WO 2011/034764 A2 | 3/2011 |
| WO | WO 2011/044423 A2 | 4/2011 |
| WO | WO 2011/044428 A2 | 4/2011 |
| WO | WO 2011/044430 A2 | 4/2011 |
| WO | WO 2011/044432 A2 | 4/2011 |
| WO | WO 2011/088004 A2 | 7/2011 |
| WO | WO 2012/030459 A1 | 3/2012 |
| WO | WO 2012/138545 A2 | 10/2012 |
| WO | WO 2012/158266 A2 | 11/2012 |
| WO | WO 2012/166236 A1 | 12/2012 |

OTHER PUBLICATIONS

Atlas Bronze, "Copper Alloys, Iron Alloys," Brochure, 2 pages.
Atlas Bronze, "Graphite Lubricated Bearings," Website, 2 pages.
de Jongh, Frits, "The Synchronous Rotor Instability Phenomenon—Morton Effect," TurboCare B.V., Hengelo, The Netherlands, Proceedings of the 37th Turbomachinery Symposium, 2008, 9 pages.
Eichenberg, Dennis J., et al., "Development of a 32 Inch Diameter Levitated Ducted Fan Conceptual Design," (NASA/TM-2006-214481), *NASA, Glenn Research Center*, Cleveland, OH, Dec. 2006, 40 pages.
Liu, Kefu; Liu, Jie, and Liao, Liang, "Application of a Tunable Electromagnetic Damper in Suppression of Structural Vibration," (No. 04-CSME-49), *Department of Mechanical Engineering, Lakehead University*, Thunder Bay, Ontario Canada, received Oct. 2004, 21 pages.
Ro Dwell, E., "Auxiliary Bearings in Vertically Oriented Machines on Magnetic Bearings," (1003177), *EPRI*, Palo Alto, CA, 2001, 110 pages.
EP 03 00 9732—European Search Report, dated Sep. 9, 2003, 6 pages.
EP 05 000 410.0—European Search Report, dated Mar. 9, 2005, 5 pages.
EP 03 009 732.3—Communication Pursuant to Article 96(2).
EP 06 817 242—Extended Supplementary European Search Report, dated Aug. 7, 2009, 3 pages.
EP 06 817 242—Supplementary European Search Report, dated Aug. 25, 2009, 1 page.
PCT/US2006/041127—International Preliminary Report on Patentability, Written Opinion of the International Searching Authority, issued Apr. 30, 2008, 4 pages.
PCT/US06/41127—Written Opinion of the International Searching Authority, mailed Mar. 19, 2007, 3 pages.
PCT/US2007/008149—International Preliminary Report on Patentability, issued Sep. 30, 2008, 4 pages.
PCT/US2007/008149—Written Opinion of the International Searching Authority, mailed Jul. 17, 2008, 3 pages.
PCT/US2007/020101—International Preliminary Report on Patentability, issued Mar. 24, 2009, 8 pages.
PCT/US2007/020101—Written Opinion of the International Searching Authority, mailed Apr. 29, 2008, 7 pages.
PCT/US2007/020471—International Preliminary Report on Patentability, issued Mar. 24, 2009, 6 pages.
PCT/US2007/020471—Written Opinion of the International Searching Authority, mailed Apr. 1, 2008, 5 pages.
PCT/US2007/020659—International Preliminary Report on Patentability, issued Mar. 31, 2009, 4 pages.
PCT/US2007/020659—Written Opinion of the International Searching Authority, mailed Sep. 17, 2008, 3 pages.
PCT/US2007/020768—International Preliminary Report on Patentability, issued Mar. 31, 2009, 8 pages.
PCT/US2007/020768—Written Opinion of the International Searching Authority, mailed Mar. 3, 2008, 7 pages.
PCT/US2007/079348—International Preliminary Report on Patentability, issued Mar. 31, 2009, 5 pages.
PCT/US2007/079348—Written Opinion of the International Searching Authority, mailed Apr. 11, 2008, 4 pages.
PCT/US2007/079349—International Preliminary Report on Patentability, issued Mar. 31, 2009, 5 pages.
PCT/US2007/079349—Written Opinion of the International Searching Authority, mailed Apr. 2, 2008, 4 pages.
PCT/US2007/079350—International Preliminary Report on Patentability, issued Mar. 31, 2009, 6 pages.
PCT/US2007/079350—International Search Report, mailed Apr. 2, 2008, 1 page.
PCT/US2007/079350—Written Opinion of the International Searching Authority, mailed Apr. 2, 2008, 5 pages.
PCT/US2007/079352—International Preliminary Report on Patentability, issued Mar. 31, 2009, 4 pages.
PCT/US2007/079352—Written Opinion of the International Searching Authority, mailed Apr. 27, 2008, 3 pages.
PCT/US2009/036142—International Preliminary Report on Patentability, issued Sep. 7, 2010, 8 pages.
PCT/US2009/036142—Notification of Transmittal of International Search Report and Written Opinion of International Searching Authority, International Search Report, mailed May 11, 2009, 3 pages.
PCT/US2009/036142—Written Opinion of the International Searching Authority, mailed May 11, 2009, 7 pages.
PCT/US2009/047662—International Preliminary Report on Patentability, issued Jan. 5, 2011, 6 pages.
PCT/US2009/047662—Written Opinion of the International Searching Authority, mailed Aug. 20, 2009, 5 pages.
PCT/US2009/047667—International Report on Patentability, issued Jan. 5, 2011, 5 pages.
PCT/US2009/047667—Written Opinion of the International Searching Authority, mailed Aug. 7, 2009, 4 pages.
PCT/US2009/047667—Notification of Transmittal of International Search Report and Written Opinion of the International Searching Authority, International Search Report, mailed Aug. 7, 2009, 3 pages.
PCT/US2010/021199—Notification of Transmittal of International Search Report and Written Opinion of International Searching Authority, International Search Report, Written Opinion of the International Searching Authority, mailed Mar. 22, 2010, 6 pages.
PCT/US2010/021199—International Preliminary Report on Patentability, issued Feb. 7, 2011, 10 pages.
PCT/US2010/021218—Notification of Transmittal of International Search Report and Written Opinion of International Searching Authority, International Search Report, Written Opinion of the International Searching Authority, mailed Mar. 23, 2010, 7 pages.
PCT/US2010/021218—International Report on Patentability, issued Jan. 26, 2011, 7 pages.
PCT/US2010/025650—Notification of Transmittal of International Search Report and Written Opinion of the International Searching Authority, International Search Report, Written Opinion of the International Searching Authority, mailed Apr. 22, 2010, 8 pages.
PCT/US2010/025650—International Report on Patentability, issued Mar. 3, 2011, 8 pages.
PCT/US2010/025952—Notification of Transmittal of International Search Report and Written Opinion of the International Searching Authority, International Search Report, Written Opinion of the International Searching Authority, mailed Apr. 12, 2010, 8 pages.
PCT/US2010/025952—International Report on Patentability, issued Mar. 4, 2011, 8 pages.
PCT/US2010/051922—Notification of Transmittal of International Search Report and Written Opinion of the International Searching Authority, International Search Report, Written Opinion of the International Searching Authority, mailed Jun. 30, 2011, 8 pages.

(56) References Cited

OTHER PUBLICATIONS

PCT/US2010/051927—Notification of Transmittal of International Search Report and Written Opinion of the International Searching Authority, International Search Report, Written Opinion of the International Searching Authority, mailed Jun. 30, 2011, 8 pages.
PCT/US2010/051930—Notification of Transmittal of International Search Report and Written Opinion of the International Searching Authority, International Search Report, Written Opinion of the International Searching Authority, mailed Jun. 30, 2011, 8 pages.
PCT/US2010/051932—Notification of Transmittal of International Search Report and Written Opinion of the International Searching Authority, International Search Report, Written Opinion of the International Searching Authority, mailed Jun. 30, 2011, 8 pages.
PCT/US2011/020746—Notification of Transmittal of International Search Report and Written Opinion of the International Searching Authority, International Search Report, Written Opinion of the International Searching Authority, mailed Sep. 23, 2011, 8 pages.
PCT/US2011/046045—Notification of Transmittal of International Search Report and Written Opinion of the International Searching Authority, International Search Report, Written Opinion of the International Searching Authority, mailed Feb. 17, 2012, 10 pages.
PCT/US2011/045987—Notification of Transmittal of International Search Report and Written Opinion of the International Searching Authority, International Search Report, Written Opinion of the International Searching Authority, mailed Mar. 21, 2012, 10 pages.
PCT/US2012/031237—International Search Report, Written Opinion of the International Searching Authority, mailed Nov. 1, 2012, 6 pages.
PCT/US2012/031240—Notification of Transmittal of International Search Report and Written Opinion of the International Searching Authority, International Search Report, Written Opinion of the International Searching Authority, mailed Oct. 19, 2012, 8 pages.
PCT/US12/31345—Notification of Transmittal of International Preliminary Report on Patentability, International Preliminary Report on Patentability, mailed May 20, 2013, 16 pages.
PCT/US2012/031345—Notification of Transmittal of International Search Report and Written Opinion of the International Searching Authority, International Search Report, Written Opinion of the International Searching Authority, mailed Oct. 31, 2012, 11 pages.

* cited by examiner

FIG. 3

WHIRL INHIBITING COAST-DOWN BEARING FOR MAGNETIC BEARING SYSTEMS

BACKGROUND

This application claims priority to U.S. patent application Ser. No. 61/502,397, which was filed Jun. 29, 2011, The priority application is hereby incorporated by reference in its entirety into the present application.

Magnetic bearings support a shaft by magnetic levitation, without physical contact, thereby eliminating mechanical wear and exhibiting very low friction. One disadvantage to magnetic bearings, however, is their inability to accommodate high dynamic loads due to their limited load capacity. During peak transient load events, the bearings are unable to control rotor motion causing the rotor to contact the bearings, resulting in significant damage thereto. To account for this, magnetic bearing systems often employ one or more coast-down bearings, also known as auxiliary, backup, secondary, or catcher bearings or bushings. The coast-down bearings are designed to support the shaft in the event of a failure or shutdown of the magnetic bearing system, while the shaft is slowing down (i.e., coasting down). This prevents the shaft from impacting and damaging the magnetic bearings.

Conventional coast-down bearings provide a clearance between the bearing and the shaft. During normal operation, the magnetic bearings support the shaft and hold it within this clearance such that the shaft rarely, if ever, contacts the coast-down bearing; thus, the coast-down bearing is typically stationary with respect to the shaft during such normal operation. When the magnetic bearing system shuts down or otherwise fails to support the shaft in the clearance, the shaft is constrained by the coast-down bearing, preventing damage to the magnetic bearing. When the shaft impacts the coast-down bearing, however, the rotational motion of the shaft is not always stable and very high stresses and dynamic loads are often endured by the coast-down bearing, which limits its useful life.

One way in which dynamic loading of the coast-down bearing can be experienced is by the shaft whirling during coast-down, that is, when the shaft "orbits" around the interior of the coast-down bearing. Whirling generally has two modes, forward whirl, where the shaft orbits in the same direction as it rotates, and backward whirl, where the shaft orbits in the opposite direction from which it rotates. Backward whirl can be particularly problematic for coast-down bearings.

What is needed then is a coast-down bearing that minimizes dynamic loading caused by whirling, thereby increasing the useful life of the coast-down bearings.

SUMMARY

Embodiments of the disclosure may provide an exemplary coast-down bearing for a magnetic bearing system. The bearing includes first, second, and third rings disposed around a shaft. The first, second, and third rings each have an inner diameter that is greater than an outer diameter of the shaft and provide a running clearance therebetween. The first, second, and third rings are eccentrically positioned with respect to each other to form a pocket for receiving the shaft during a drop, radial shock, or both.

Embodiments of the disclosure may also provide an exemplary method for reducing shaft whirl during coast-down. The method includes receiving a shaft in a pocket formed by first and second eccentric rings of a coast-down bearing disposed around the shaft. The method also includes maintaining a center of the shaft below a nominal center of the coast-down bearing.

Embodiments of the disclosure may further provide an exemplary apparatus for supporting a shaft during coast-down. The apparatus includes a plurality of eccentric rings disposed around the shaft and radially-spaced therefrom to provide a running clearance between the shaft and the plurality of eccentric rings. At least two of the plurality of eccentric rings each have a center vertically offset above a nominal center of the apparatus, such that the at least two of the plurality of eccentric rings provide a pocket to receive the shaft during the coast-down.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
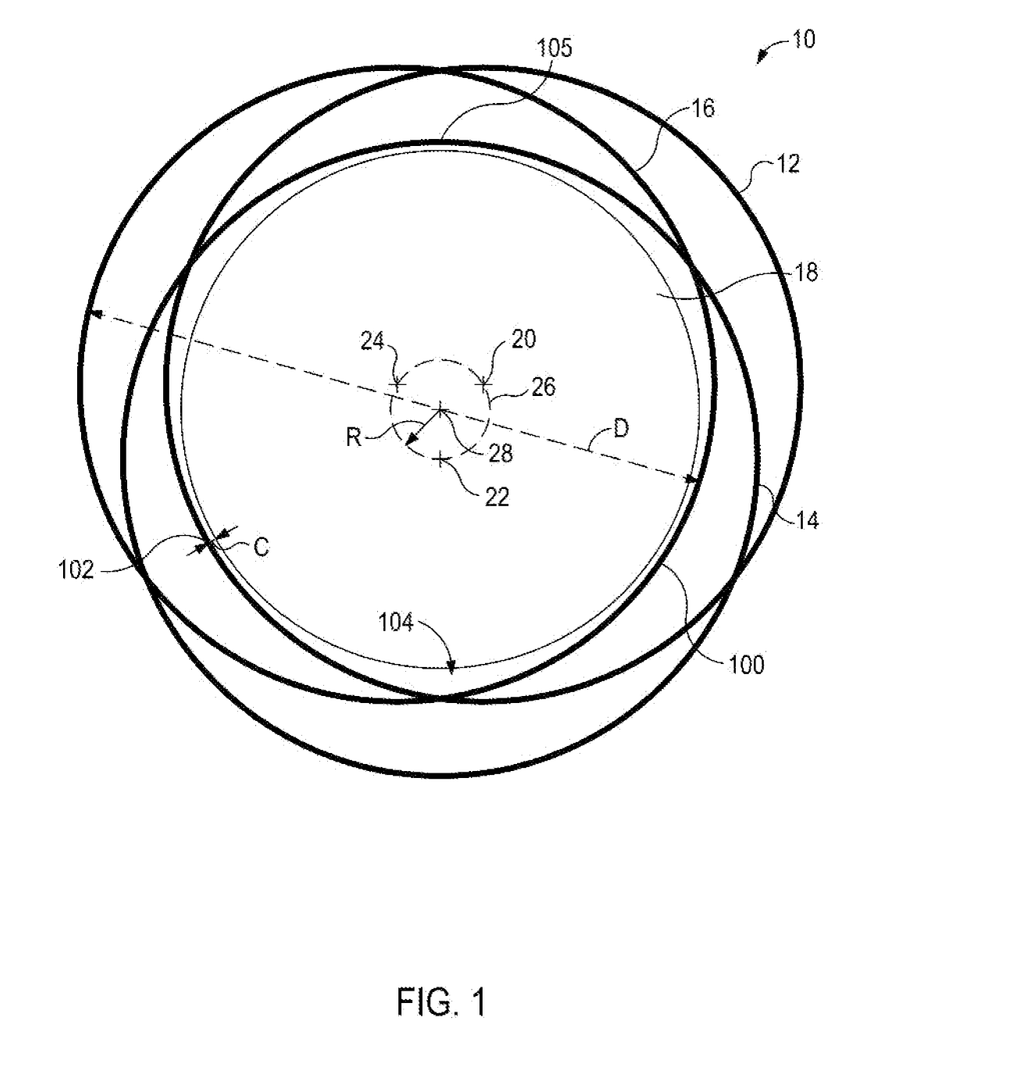
FIG. 1 illustrates a schematic, axial end view of an exemplary coast-down bearing, according to an aspect of the disclosure.
Figure 2:
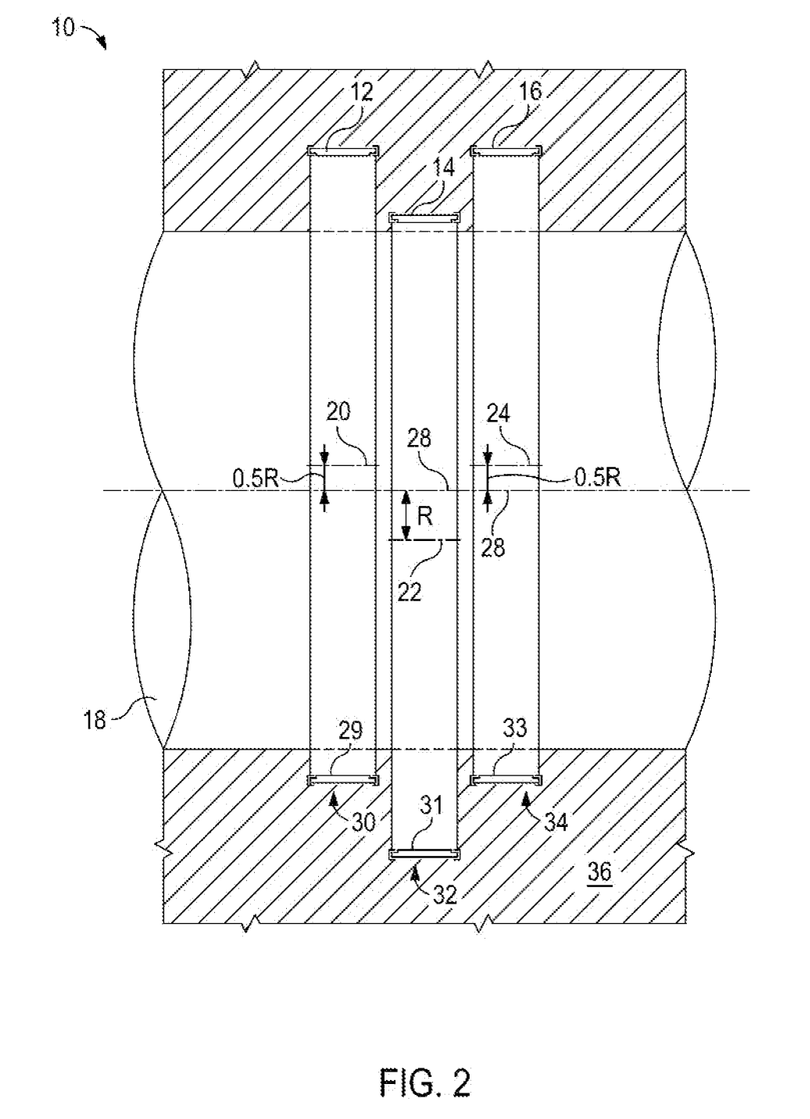
FIG. 2 illustrates a schematic, side view of an exemplary coast-down bearing, according to an aspect of the disclosure.

FIGS. 1 and 2 illustrate a schematic, axial end view and a schematic, side view, respectively, of a coast-down bearing 10, according to an exemplary embodiment. The bearing 10 generally includes a plurality of eccentric rings (three are shown: 12, 14, 16). The rings 12, 14, 16 are generally annular and sized to receive a shaft 18 therethrough. The rings 12, 14, 16 may be constructed from a wear-resistant material, as is known in the art. In an exemplary embodiment, the rings 12, 14, 16 may all have a common inner diameter D. In other embodiments, the rings 12, 14, 16 may have varying, but approximately equal diameters D. The shaft 18 may be supported by one or more magnetic radial bearings (not shown) during normal operation, and supported by the bearing 10 during, for example, a "drop event" such as a shutdown or failure of the magnetic radial bearing to support the shaft 18. The shaft 18 may be configured for use in a turbomachine, such as a centrifugal compressor, although the shaft 18 may be part of any other rotating machine, whether capable of transferring energy to or from a process fluid or used for other purposes.

Each of the rings 12, 14, 16 defines a center 20, 22, 24, respectively, about which each ring 12, 14, 16 is disposed. In an embodiment, the centers 20, 22, 24 may define and be angularly spaced apart or offset around a circle 26. The circle 26 may be further defined by a radius R, which extends from a nominal center 28 of the coast-down bearing 10 and represents the distance from the nominal center 28 to the centers 20, 22, 24. During normal operation, the central axis of the shaft 18 generally resides at the nominal center 28 of the coast-down bearing 10, as shown, although deviations in the position of the shaft 18 are expected due to vibration, shaft eccentricities, rotordynamic anomalies, etc. Given the offset centers 20, 22, 24, the rings 12, 14, 16 may be described as being eccentrically-disposed with respect to the shaft 18 and/or with respect to each other. It will be appreciated that the eccentricity of the rings 12, 14, 16 is exaggerated in FIGS. 1 and 2 for illustrative purposes and the radius R may be less than about 10 thousandths of an inch (0.010 inches), for example. Furthermore, the centers 20, 22, 24 may not all be precisely offset by the same, uniform distance from the nominal center 28, but may be offset by a substantially uniform distance, for example, the center 20 may be offset from the nominal center 28 by a distance that is within about 20%, about 15%, about 10%, about 5%, about 2%, or about 1% of the distance that the other centers 22, 24 are offset from the nominal center 28.

In an exemplary embodiment, the centers 20, 22, 24 may be separated or offset equiangularly around the circle 26. For example, in the illustrated three-ring embodiment of the bearing 10, the centers 20, 22, 24 may be separated by about 120 degrees around the circle 26. In embodiments including additional rings (not shown), the centers 20, 22, 24 may be separated by an angle equal to approximately 360 degrees divided by the number of rings. In other embodiments, however, the centers 20, 22, 24 may be separated by unequal angular amounts, which may be of any angular measurement.

The rings 12, 14, 16, as best illustrated in FIG. 2, may be stacked axially along the shaft 18 to provide the bearing 10. The rings 12, 14, 16 may be directly supported by a housing 36 in which the shaft 18 is disposed, or may be indirectly supported by the housing 36, for example, via one or more support structures (not shown). Although not shown, in various embodiments, the rings 12, 14, 16 may be coupled together and/or contained in a common housing 36, which may be directly or indirectly supported by a casing for housing the shaft 18 and/or any other rotatable components of the machine (not shown). In various embodiments, however, such housing 36 and/or other axial interconnection between the rings 12, 14, 16 may be unnecessary and/or advantageously omitted. In various embodiments, a compliant material (not shown) such as a metal mesh may be employed to provide damping and thus reduce vibration as the shaft 18 decelerates during coast-down. Such a compliant material may be disposed between the rings 12, 14, 16 and the housing 36 and/or between the housing 36 and the casing (not shown) in which the shaft 18 is disposed.

As shown, the angular separation of the centers 20, 22, 24 may translate into an arrangement of different vertical locations for the rings 12, 14, 16 with respect to one another and/or to the shaft 18. For example, rings 12 and 16 may be disposed at approximately the same vertical position, as shown, while the ring 14 is offset with respect thereto, being disposed at a lower vertical position. Further, as shown in FIG. 1, the rings 12, 16 may be laterally offset from each other and from the ring 14, such that the rings 12 and 16 occupy opposite lateral extremes of the bearing 10, as shown, with the ring 14 positioned laterally between the two other rings 12, 16. In at least one embodiment, the center 22 of the ring 14 is offset vertically from the center 28 by the radius R, while the other two centers 20, 24 are offset vertically from the center 28 by about 0.5 times the magnitude of the radius R. It will be appreciated, however, that other relative angular positioning of the rings 12, 14, 16 with respect to each other and/or the shaft 18 is contemplated herein, the illustrated embodiment being one example of many consistent with this disclosure.

Referring again to FIG. 1, the rings 12, 14, 16 are sized and positioned to provide a running clearance C between the bearing 10 and the shaft 18, such that the shaft 18 generally does not contact the rings 12, 14, 16 during normal operation (i.e., when the shaft 18 is effectively suspended by the magnetic radial bearings (not shown)). Proceeding around the shaft 18, the clearance C varies, decreasing in magnitude until it reaches a minimum at an angular location between two of the centers 20, 22, 24, and then proceeding back to a maximum at an angular location where two of the rings 12, 14, 16 appear to overlap (again, it being appreciated that the rings 12, 14, 16 remain spaced axially apart).

In an exemplary embodiment, the rings 12, 14, 16 may be capable of rotating by engagement with the shaft 18, such that they retain their respective centers 20, 22, 24 but are capable of rotating. Accordingly, during normal operation, the rings 12, 14, 16 may be stationary or nearly so, but may not be restrained from rotating. When the shaft 18 contacts the rings 12, 14, 16 during a drop (i.e., when the primary magnetic radial bearings (not shown) are shutdown or otherwise fail to support the shaft 18 in the clearance C), friction forces applied by the rotating shaft 18 may cause the rings 12, 14, 16 to accelerate rapidly, to at least a fraction of the rotational speed of the shaft 18. In such rotating embodiments, the rings 12, 14, 16 may include pilot rings 29, 31, 33, respectively, which are disposed in annular grooves 30, 32, 34, respectively, defined in the housing 36. The pilot rings 29, 31, 33 may be coated in and/or fabricated from anti-friction material, as known in the art, and may slide against and be supported by the annular grooves 30, 32, 34. In some embodiments, however, the pilot rings 29, 31, 33 may slide on rolling elements (not shown) and/or may be lubricated, floating in fluid, or the like. One, some, or all of the rings 12, 14, 16 may, however, be stationary, and may or may not include such pilot rings 29, 31, 33 and/or grooves 30, 32, 34, but may be otherwise mounted in the housing 36.

The pilot rings 29, 31, 33 may provide reduced friction surfaces, as well as functioning to preserve alignment of the bearing 10 during coast-down. In some embodiments, however, the pilot rings 29, 31, 33 may be omitted and a coating or substance may be applied on the outside surface of the rings 12, 14, 16 and/or inside surface of the annular grooves 30, 32, 34 to accomplish a desired reduction in friction.

In exemplary operation, the magnetic radial bearings (not shown) may drop the shaft 18 (i.e., initiating a "drop event"), such that it initially falls vertically downward, for example, shifting its center 28 toward the center 22. Before the center 28 of the shaft 18 can reach the center 22 of the ring 14, however, the shaft 18 contacts the rings 12, 16 along two lines of contact 100, 102. As shown, the two lines of contact 100, 102 are not directly below the shaft 18, but are positioned at angular offsets due to the upward and lateral shifting of the rings 12 16. As such, the rings 12, 16 form a "pocket" 104 for receiving the shaft 18. In the pocket 104, the lateral distance over which the shaft 18 is free to move, before it engages one of the rings 12, 16 is reduced, as compared to a more traditional single-ring bearing.

The ring 14 provides a "roof" for the pocket 104, formed by the rings 12, 16, further constraining the vibration amplitude of the shaft 18 and maintaining the center 28 of the shaft 18 in the lower half of the bearing 10. Accordingly, the ring 14 may provide a third line of contact 105 which engages the shaft 18. By constraining the shaft 18 in the lower half of the bearing 10, the bearing 10 resists the shaft 18 tendency to whirl during coast down, thereby reducing dynamic loading on the bearing 10.

As noted above, the rings 12, 14, 16 may be generally stationary or may rotate with the shaft 18. When configured to rotate with the shaft 18, the rings 12, 14, 16 may receive energy from contact with the rotating shaft 18 after the drop and during coast-down. Inertia of the rings 12, 14, 16 is minimized, thereby enabling the rings 12, 14, 16 to increase in speed to an intermediate speed that is a fraction of the speed of the shaft 18. This may further reduce the energy transferred from the shaft 18 to the bearing 10, thereby increasing the useful life of the bearing 10.

Figure 3:
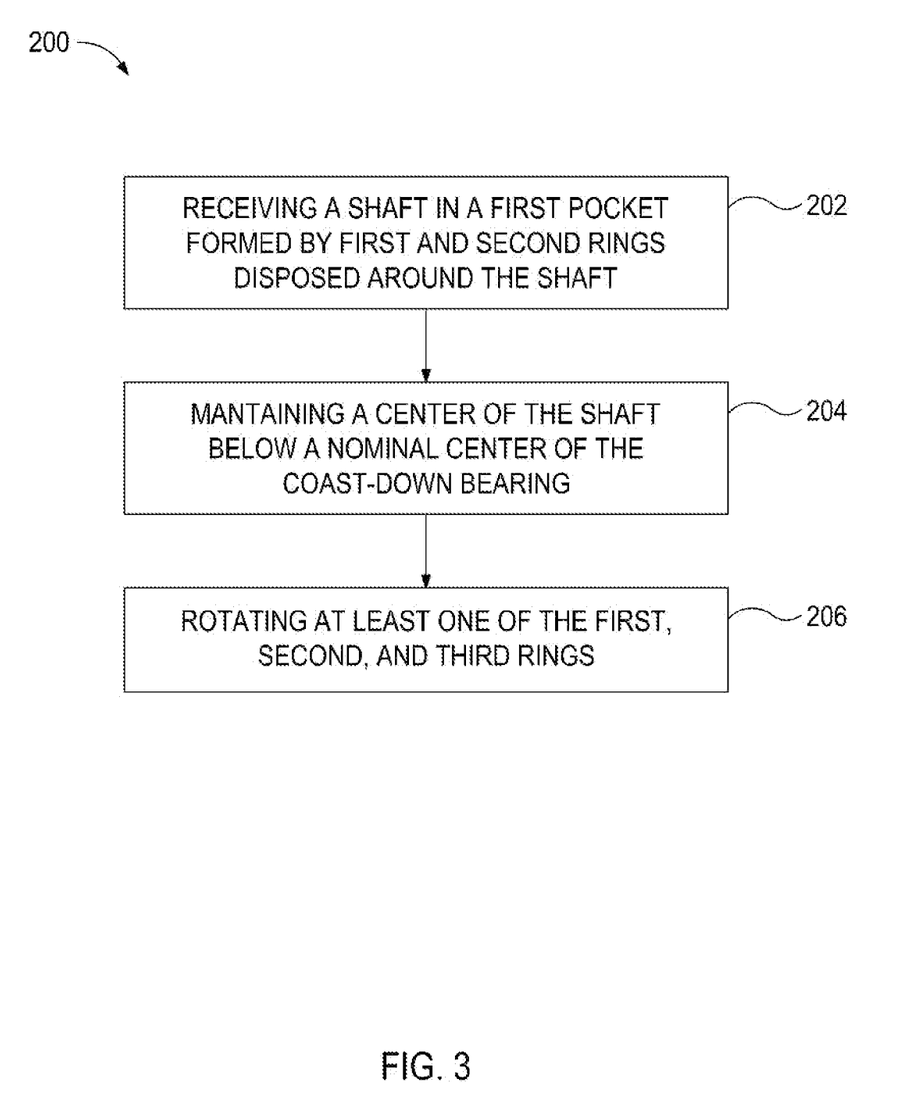
FIG. 3 illustrates a flowchart of an exemplary method for supporting a shaft during coast-down, according to an aspect of the disclosure.

FIG. 3 illustrates a flowchart of an exemplary method 200 for reducing shaft whirl during coast-down. The method 200 may proceed by operation of the bearing 10 described above with reference to FIG. 1-2 and may thus be best understood with reference thereto. The method 200 generally includes receiving a shaft in a pocket formed by first and second eccentric rings of a coast-down bearing disposed around the shaft, as at 202. The method 200 may also include maintaining a center of the shaft below a nominal center of the coast-down bearing, as at 204.

In an exemplary embodiment, receiving the shaft in the pocket at 202 may include contacting the shaft with the first ring along a first line of contact and contacting the shaft with the second ring along a second line of contact to constrain vibration of the shaft. Furthermore, maintaining the center of the shaft below the nominal center of the bearing at 204 may include providing a roof for the pocket with a third ring of the coast-down bearing. Additionally, the method 200 may include rotating at least one of the first, second, and third rings at a speed that is at least a fraction of a rotational speed of the shaft, as at 206.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for supporting a shaft during coast-down, the apparatus comprising:
   a plurality of eccentric rings disposed around the shaft and radially-spaced therefrom to provide a running clearance between the shaft and the plurality of eccentric rings, wherein
      at least two of the plurality of eccentric rings each have a center vertically offset above a nominal center of the apparatus, such that the at least two of the plurality of eccentric rings provide a pocket to receive the shaft during the coast-down, and
      at least one of the plurality of eccentric rings is received in a groove defined in a housing, the housing receiving the shaft and the housing supporting the apparatus.

2. The apparatus of claim 1, wherein the centers of the at least two of the plurality of eccentric rings are laterally-offset with respect to each other.

3. The apparatus of claim 2, wherein another one of the plurality of eccentric rings defines a center that is vertically-offset below the nominal center.

4. The apparatus of claim 1, wherein the plurality of eccentric rings each define an inner diameter, the inner diameters of each being approximately the same.

5. The apparatus of claim 1, wherein at least one of the plurality of eccentric rings is configured to rotate at a speed that is at least a fraction of a rotational speed of the shaft during a shaft drop.

6. The apparatus of claim 5, wherein at least one of the plurality of eccentric rings includes a pilot ring slidably disposed in the groove.

7. The apparatus of claim 1, wherein at least one of the plurality of eccentric rings has a center vertically offset below the nominal center, such that the at least one of the plurality of eccentric rings provides a roof for the pocket.

8. A coast-down bearing for a magnetic bearing system, the coast-down bearing comprising:
   first, second, and third rings disposed around a shaft, wherein
      each of the first, second, and third rings has an inner diameter that is greater than an outer diameter of the shaft and a running clearance is defined between each of the first, second, and third rings and the shaft,
      the first, second, and third rings are eccentrically positioned with respect to each other to form a pocket for receiving the shaft during a drop, radial shock, or both, and
      each of the first, second, and third rings is received in a respective annular groove defined in a housing, the housing receiving the shaft and the housing supporting the coast-down bearing.

9. The coast-down bearing of claim 8, wherein the first, second, and third rings each define a center offset by a substantially uniform distance from a nominal center of the coast-down bearing and defining a circle around the nominal center.

10. The coast-down bearing of claim 9, wherein the centers of the first, second, and third rings are offset from one another by about 120 degrees around the circle.

11. The coast-down bearing of claim 8, wherein the first, second, and third rings each define a center, the centers of the first and third rings being positioned vertically above the center of the second ring.

12. The coast down bearing of claim 11, wherein the first and third rings are configured to provide the pocket to receive the shaft.

13. The coast-down bearing of claim 8, wherein the inner diameters of the first, second, and third rings are approximately the same.

14. The coast-down bearing of claim 8, wherein at least one of the first, second, and third rings is configured to rotate by contact with the shaft during said drop, said radial shock or both.

15. The coast-down bearing of claim 14, wherein the at least one of the first, second, and third rings includes a pilot ring, the pilot ring being disposed in the annular groove that receives the at least one of the first, second, and third rings.

16. The coast-down bearing of claim 8, wherein at least one of the first, second, and third rings is configured to remain stationary when shaft is dropped.

* * * * *